(12) United States Patent
Ciminelli

(10) Patent No.: US 6,568,276 B1
(45) Date of Patent: May 27, 2003

(54) STRAIN GAUGE BASED SENSOR WITH IMPROVED LINEARITY

(75) Inventor: Mario J. Ciminelli, Seaford, VA (US)

(73) Assignee: Measurement Specialties, Inc.

( * ) Notice: Subject to any disclaimer, the term of this patent is extended or adjusted under 35 U.S.C. 154(b) by 0 days.

(21) Appl. No.: 09/633,177

(22) Filed: Aug. 4, 2000

(51) Int. Cl.⁷ .................................................. G01L 9/04
(52) U.S. Cl. .................................................... 73/720
(58) Field of Search ............................ 73/727, 726, 720, 73/718, 719

(56) References Cited

U.S. PATENT DOCUMENTS 4,600,912 A  *  7/1986  Marks et al. .................. 338/42
4,905,575 A  *  3/1990  Knecht et al. ................. 92/103
6,006,607 A  * 12/1999  Bryzek et al. ................. 73/727

* cited by examiner

Primary Examiner—Hezron Williams
Assistant Examiner—Jewel V. Thompson
(74) Attorney, Agent, or Firm—Duane Morris LLP

(57) ABSTRACT

A strain gauge based sensor for use in relatively high pressure applications has a diaphram frame with an active diaphragm portion having a high t/D ratio, or $t^2/A$ ratio, and an annular groove provided in at least a portion of a periphery of the diaphram frame which alters the strain field on the surface of the active diaphram, causing the radial stresses to be primarily bending stresses and minimizing shear stresses, thus bringing the $\epsilon t/\epsilon c$ ratio closer to one and increasing the linearity of the output of strain gauges affixed to the top of the diaphram.

38 Claims, 11 Drawing Sheets

STRAIN GAUGE BASED SENSOR WITH IMPROVED LINEARITY

BACKGROUND

This invention relates generally to strain gauge based sensors, and more particularly, to strain gauge based sensors having diaphragms with a high thickness to diameter ratio, such as would be utilized in relatively high pressure applications.

It is well known in the art to utilize strain gauge based sensors to measure pressure. A particular type of strain gauge based pressure sensor, as an example and for purposes of describing a prior art type of such sensor, can be threaded into the fuel rail of a diesel engine. Such sensor has a general appearance of a bolt—a threaded shaft portion extending downwardly from a hex shaped head portion, by which shaft the sensor can be threaded into the aforementioned fuel rail. However, unlike the bolt which it resembles, the threaded shaft of the sensor has a cylindrical bore which extends upwardly through the hex shaped head and into a generally cylindrical portion projecting above the head, which is commonly referred to as the "diaphragm frame" of the sensor. The bore extends up into, but not through, the diaphragm frame, leaving a certain thickness of material above the bore which is referred to as the "active diaphragm." Although there is a corner radius (r) blending the bore into the underside of the active diaphragm, the diameter of the active diaphragm is generally considered equal to the diameter of the bore. Conventionally, four relatively large individual strain gauges are affixed to the top surface of the active diaphragm, and perhaps partially on the diaphragm frame, for transforming the pressure induced deflection of the diaphragm into electrical output representative of the magnitude of the pressure acting on the underside of the active diaphragm.

The primary design factors in constructing such strain gauge based sensors are the diaphragm thickness ("t"); the active diaphragm diameter ("D"); and the diaphragm frame diameter ("d"). The thickness of the active diaphragm has a very significant effect on the static accuracy of the sensor. Thinner active diaphragms generally provide better static accuracy, for reasons which will be explained in more detail hereinafter. The static accuracy of strain gauge based sensors is typically discussed in terms of the "linearity" of their output and refers to the linearity and hysteresis of the sensor. Strain gauge based sensors typcially use four (or two) strain gauges connected into a wheatstone bridge configuration. When excited by a constant voltage (or current), the bridge provides a voltage output (e.g. in the millivolt range) which is directly related to applied pressure. The strain gauges are typically located on the diaphragm surface such that the resistance of two (or one) of them increases with applied pressure, while the resistance of the other two (or one) decreases. Optimal linearity is achieved when the magnitude of these resistance changes are equal. A problem with static accuracy arises when designing strain gauge based sensors which must be utilized in high pressure applications. In such applications, the active diaphragm of conventional strain gauge based sensors must be constructed with a relatively high thickness ("t") to diameter ("D") ratio ("t/D") in order to structurally withstand the high pressures. This is disadvantageous because an active diaphragm having a relatively high t/D ratio generally has a lower degree of accuracy. The short explanation for this, without digressing into a discussion of theoretical equations, is that simple diaphragm theory holds true when the thickness to diameter ratio (t/D) of the active diaphragm is about 0.15 or less. According to simple diaphragm theory, when the t/D ratio is 0.15 or less the deflection of the active diaphragm is almost entirely dominated by bending stresses, with shear stresses considered negligible or insignificant such that radial stress essentially equals bending stress. However, as the t/D ratio increases, so do the shear stresses, which can no longer be considered insignificant. Consequently, simple diaphragm theory will not apply. Moreover, the shape of the deflection curve is altered by the increased shear stresses which also results in degrading the linearity of the output of the wheatstone bridge, and hence the accuracy of the sensor.

In the prior art, low pressure sensors are known to be susceptible to output shifts/drifts as a result of stress from mounting the sensor being induced in the active diaphragm. The mounting stress can be induced as a result of overtightening the sensor into a threaded opening. As a means of relieving mounting-induced stress, some prior art low pressure strain gauge sensors (e.g. 2500 psi and below pressure sensors) are known to have a groove provided in the diaphragm frame of the sensor such that torque induced stress transferred to the active diaphragm or the diaphragm frame is minimized. However, the groove in the diaphragm frame does not improve the linearity of the output of these low pressure strain gauges. In such low pressure applications, a high t/D ratio is unnecessary. Thus the t/D ratio of such low pressure sensors is designed at 0.15 or less, whereby the linearity of the output is already optimal. In the absence of a high t/D ratio active diaphragm, such as required in high pressure applications, the groove is of negligible or no value in low pressure strain gauge sensors except for the aforementioned purpose of stress relief.

Accordingly, there is a need for a strain gauge based sensor which provides improved linearity output for high pressure sensors having active diaphragms with a high t/D ratio.

SUMMARY

A strain gauge based sensor for use in relatively high pressure applications, having an active diaphragm with a high t/D ratio, is provided with an annular groove in the outer periphery of the diaphragm frame of the sensor which results in improved linearity of the output of the strain gauges. The annular groove preferably is provided entirely around the periphery of the diaphragm frame, however it can also be that only a portion, or portions, of the periphery are provided with an annular groove. This would also result in some degree of improved linearity. The annular groove in the periphery of the diaphragm frame alters the strain field on the surface of the high t/D active diaphragm, causing the radial stresses to be primarily bending stresses and minimizing shear stresses. As a result, the high t/D active diaphragm sensor behaves more like a sensor having a diaphragm with a t/D of 0.15 or less, wherein active diaphragm deflection is almost entirely dominated by bending stresses and shear stress are insignificant. The annular groove is provided in the diaphragm frame at a location near enough to the top surface such that the portion of the diaphragm frame above the annular groove is able to flex slightly under the pressure applied to the sensor. However, the depth and width of the frame groove must also be designed such that the sensor can withstand the high pressure or load to which it is subjected. The slight flexing of the portion of the diaphragm frame above the annular groove alters the strain field, thus inducing the increased bending stresses and minimizing the shear stresses, which ultimately results in the improved linearity of the output of the strain gauges. The diaphragm frame, active diaphragm and bore may also have a non-cylindrical cross section shape, in which case a ratio in terms of thickness to surface area can be used instead of t/D. This invention may also be used with all types of strain gauges, including individual strain gauges, integrated half bridge gauges, or integrated full bridge strain gauges, to name a few. Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
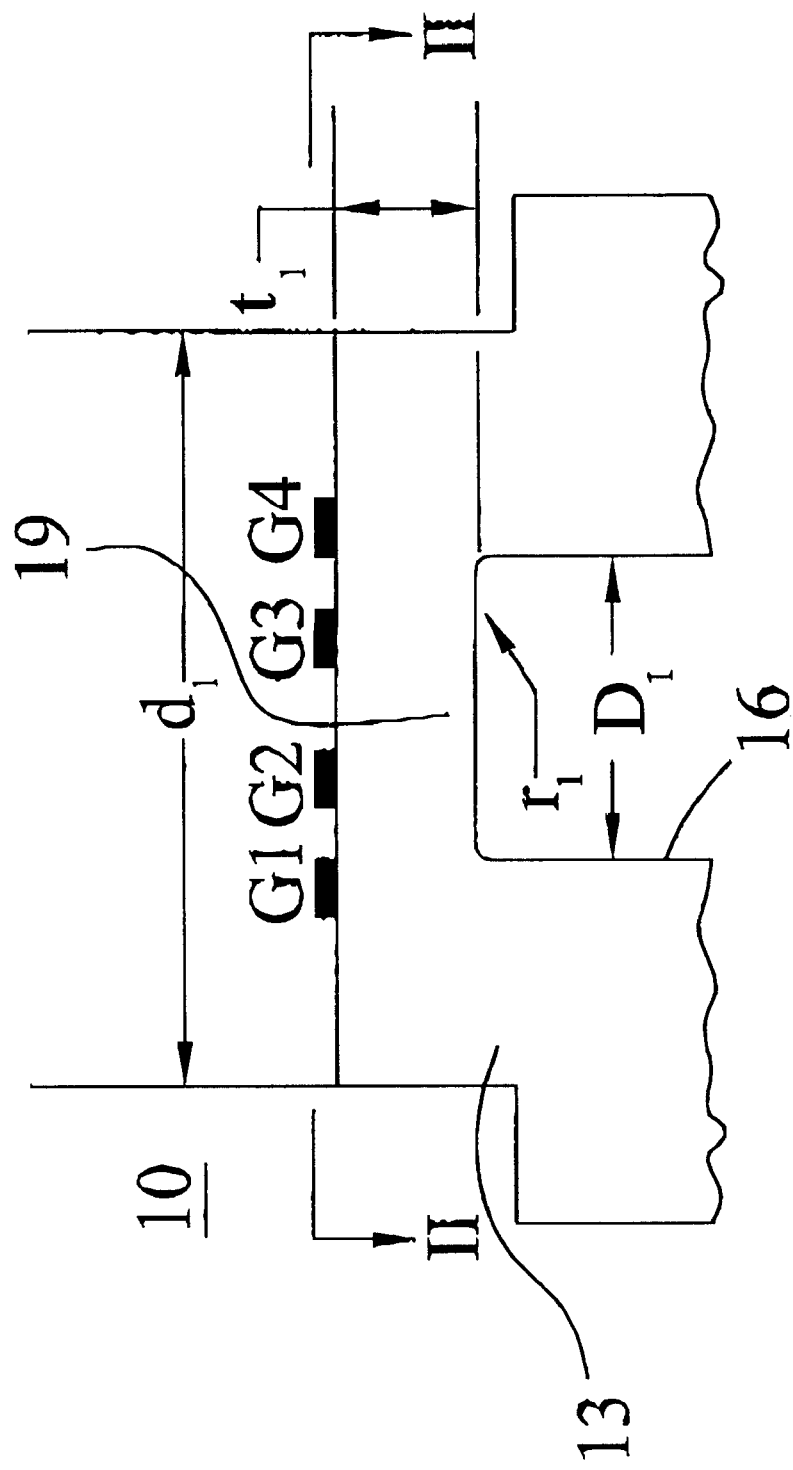
FIG. 1 is a front cross sectional view of an upper portion of a prior art strain gauge based pressure sensor having a high t/D ratio active diaphragm.
Figure 2:
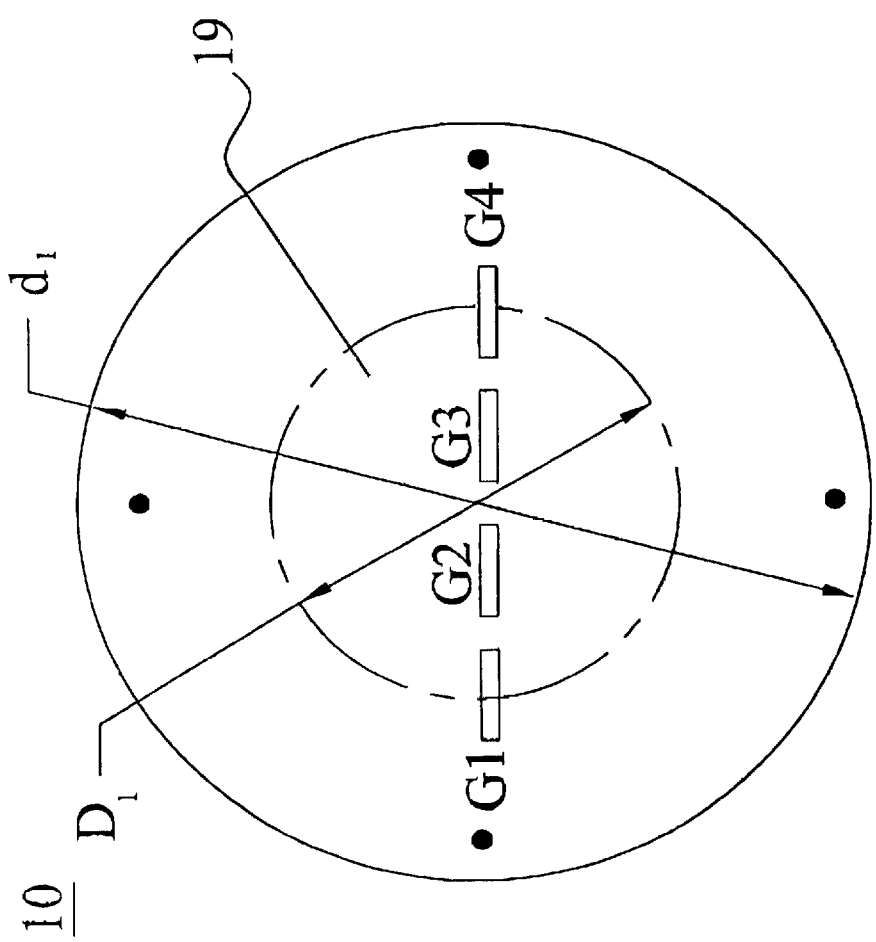
FIG. 2 is a top plan view taken along line II—II in FIG. 1.

An understanding of the present invention can be most easily achieved by first understanding a prior art strain gauge based pressure sensor 10, as shown in FIGS. 1–2. This sensor 10 is representative of conventional strain gauge based pressure sensors designed for use in relatively high pressure types applications, such as those applications for which the present invention is suitably designed to provide improved accuracy. For convenience, only the upper portion of the conventional strain gauge based sensor 10 is illustrated in FIG. 1, since that portion, particularly the diaphragm frame 13 and the active diaphragm 19, is generally the pertinent portion of such strain gauge sensors in regard to the present invention. The lower portion of the sensor 10 can simply be as described previously in the background of the prior art, generally resembling a bolt—having a threaded shaft portion extending downwardly from a hex shaped head portion, and a bore 16 provided through the shaft and up into the diaphragm frame 13 of the sensor 10. The bore communicates between the underside of the active diaphragm 19 and the pressure or load which is to be sensed by the strain gauges G1–G4 affixed to the top surface of the active diaphragm 19. The corner radius, $r_1$, is directly related to the diameter $D_1$ and the thickness t, of the active diaphragm 19 in that it must increase with any increase in the ratio $t_1/D_1$ in order to prevent the maximum design stress, which occurs at the corner, from exceeding material limits.

As explained previously, the thickness $t_1/D_1$ ratio of the active diaphragm 19 has significant effect on the accuracy of the sensor 10, in that a thinner active diaphragm 19 generally provides improved linearity of output of the strain gauges G1–G4. However, in high pressure sensors such as the sensor 10, the active diaphragm 19 must be constructed with a relatively high t/D ratio, typically much greater than the preferred ratio of 0.15 for low pressure sensor design. This is necessary in order for the active diaphragm 19 to structurally withstand the high pressures exerted thereon. As an example, and just for purposes of this description, the sensor 10 in FIG. 1 can have a $t_1/D_1$ ratio of 0.345, which is more than twice the preferred t(D ratio. Consequently, simple diaphragm theory will not apply for high pressure sensor applications because shear stresses cannot be considered insignificant.

For active diaphragms having a t/D ratio of 0.15 or less, simple diaphragm theory applies and shear stresses are considered negligible, whereby radial stress approximately equals bending stress. In this case, the resulting radial strain field across the top of the diaphragm will generally have a ratio of maximum tensile ("∈t") and compressive ("∈c") strains ("∈t/∈c") of approximately 0.667. However, as the t/D ratio increases so do shear stresses, which cause the shape of the deflection curve (of the active diaphragm) to become more "spherical". As a consequence, the magnitude of the maximum compressive strain ∈c decreases, causing the ∈t/∈C ratio to increase. Generally, this cannot be shown using theoretical equations. However, it can be confirmed utilizing computer simulation, as illustrated in FIG. 12.

Figure 12:
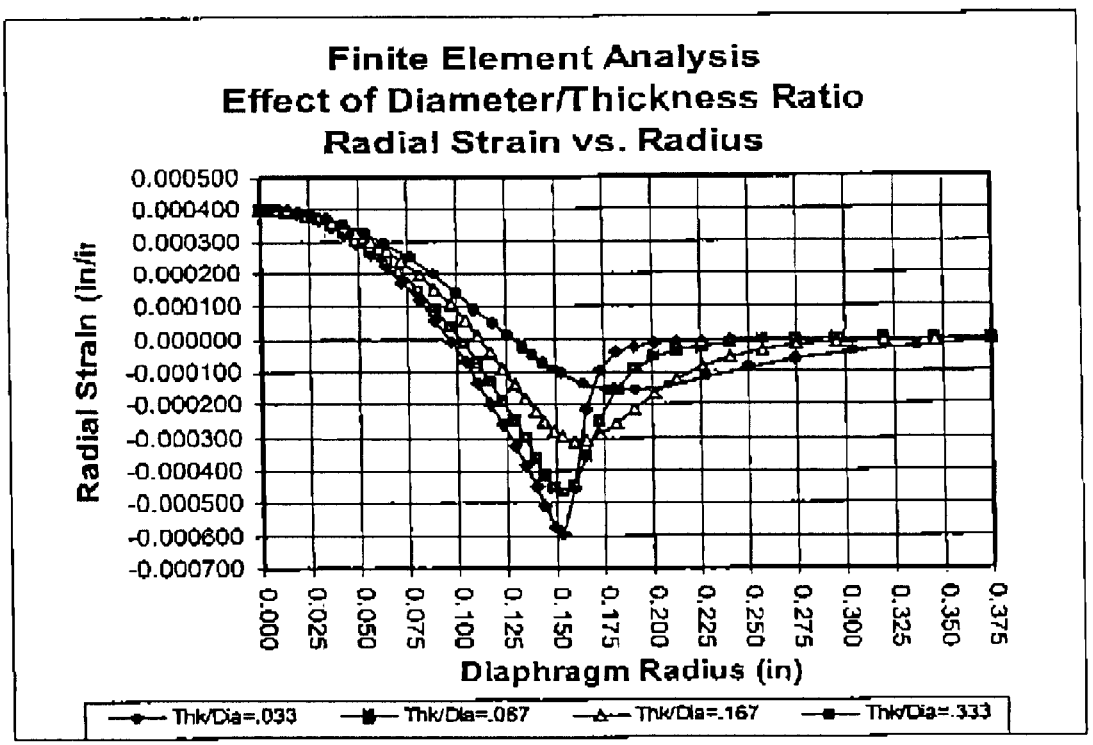
FIG. 12 is a graph representing a finite element analysis of the effect of strain gauge thickness/diameter (T/D) ratios on radial strain as a function of diaphragm radius.

FIG. 12 shows that as the t/D, ie. "Thickness/Diameter," ratio increases, the magnitude of the maximum compressive strain, i.e. "Radial Strain" decreases. This is displayed in FIG. 12 by the decreasing amount of the "dip" in each line corresponding to the increasing t/D) ratio. As the t/D ratio is increased beyond 0.15, the curvature of the lines representing radial strain vs. radius (D/2) of the diaphragm can be seen to generally flatten out.

Figure 3:
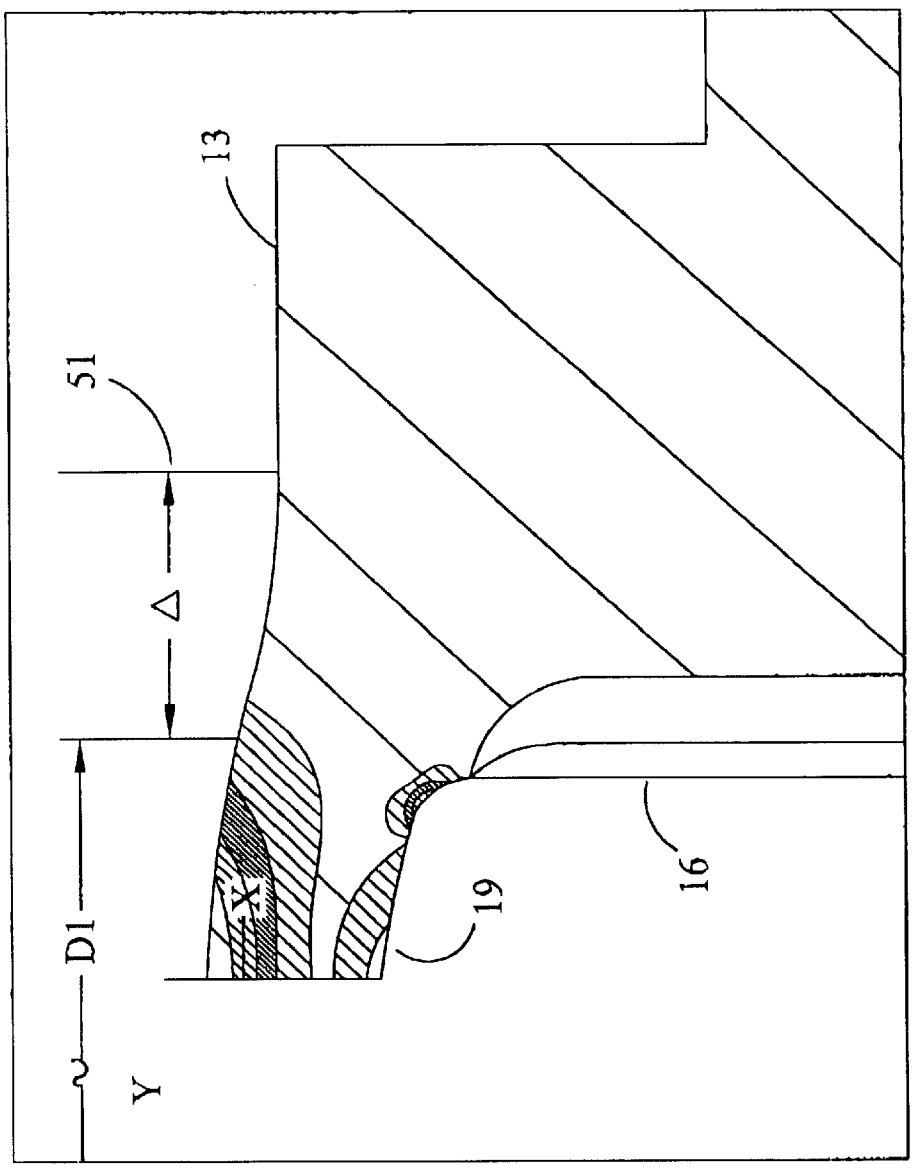
FIG. 3 shows the deflection of the active diaphragm of the sensor shown in FIG. 1.

A finite element analysis plot, showing radial strain for example, of the prior art sensor 10 is shown in FIG. 3, which illustrates the deflection of the high $t_1/D_1$ active diaphragm 19, and, undesirably, the diaphragm frame 13. The plot shows a cross section view of only half of the active diaphragm 19 and diaphragm frame 13 of the sensor 10. However, the other half is simply a mirror image of the half shown. When high pressure is applied to the underside of the active diaphragm 19 through the bore 16, the deflection exhibits a shape referred to as "spherical" due to the increased shear stresses which result from the high $t_1/D_1$ ratio of the active diaphragm 19. The "spherical" shape referred to can be most easily grasped by looking at the plot in FIG. 3 and noticing that the deflection caused by the pressure actually extends a certain distance "Δ" beyond the diameter $D_1$ of the active diaphragm 19, out into the diaphragm frame 13 of the sensor 10. This deflection causes the entire top of the diaphragm, both the diaphragm frame 13 and the active diaphragm 19, to take on a "spherical" shape, hence the term. The distance A, from $D_1$ out to line 51, illustrates the extension of the pressure or load induced deflection beyond the diameter ($D_1$) of the active diaphragm 19. Ideally, there should be no deflection in the diaphragm frame 13, as is normally the case where the t/D ratio is 0.15 or less. This intrusion of the deflection into the diaphragm frame 19 disadvantageously alters the strain field and also causes it to undesirably encompass more than the diameter $D_1$ of the active diaphragm 19. The outputs of the strain gauges G1–G4 (FIG. 1) are generally more accurate where the strain field is closely associated with only the diameter $D_1$ of the active diaphragm 19 and does not extend over into the diaphragm frame 13. This is generally not a problem in low pressure strain gauge sensors, having a t/D ratio of 0.15 or less, because the diaphragm frame, not being subject to such high pressures, is sufficiently sturdy to resist any significant deflection which would alter the strain field or permit it to intrude beyond the active diameter of the active diaphragm.

Deflection of the active diaphragm 19 resulting from pressure exerted on the underside thereof creates a strain (ε) field across the top surface of the diaphragm 19. This strain is conventionally sensed by four strain gauges G1–G4, which are affixed to the top surface of the diaphragm 19. These strain gauges G1–G4 transform the pressure or load induced deflection into a change in their resistance which are representative of the magnitude of the pressure exerted on the active diaphragm 19. The relation between strain and resistance is given by the following equation.

$\Delta R = G_F * \Delta\epsilon$, where $G_F$ is the gauge factor of the particular type of strain gauge and Δε is the change in strain as a result of the application of pressure.

Figure 10:
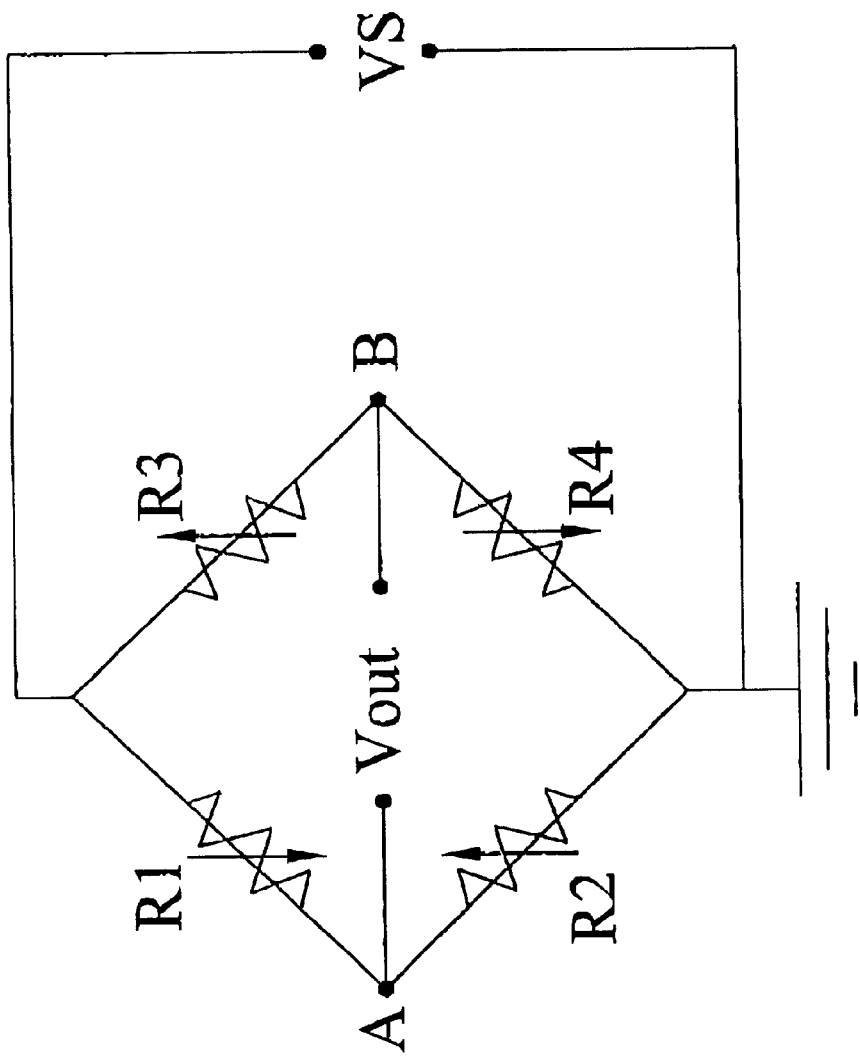
FIG. 10 represents a conventional Wheatstone bridge active strain gauge configuration.

Conventionally, four (or two) active strain gauges, such as G1–G4, are connected in a configuration known as a Wheatstone bridge, an example of such, using four active strain gauges, is shown in FIG. 10. Ideally, the sum of the percent change in resistance of the gauges in tension is equal and opposite to the sum of the percent change in resistance of the gauges in compression. This is shown by the equation: (ΔR2%+ΔR3%)=−(ΔR1%+ΔR4%). The output of the sensor in response to an applied pressure (or load) is given by the equation:

$$Vout = [V_A - V_B] = [V_S] * \left[\left(\frac{R2}{R1+R2}\right)\right] - \left[\left(\frac{R4}{R3+R4}\right)\right]$$

Figure 11:
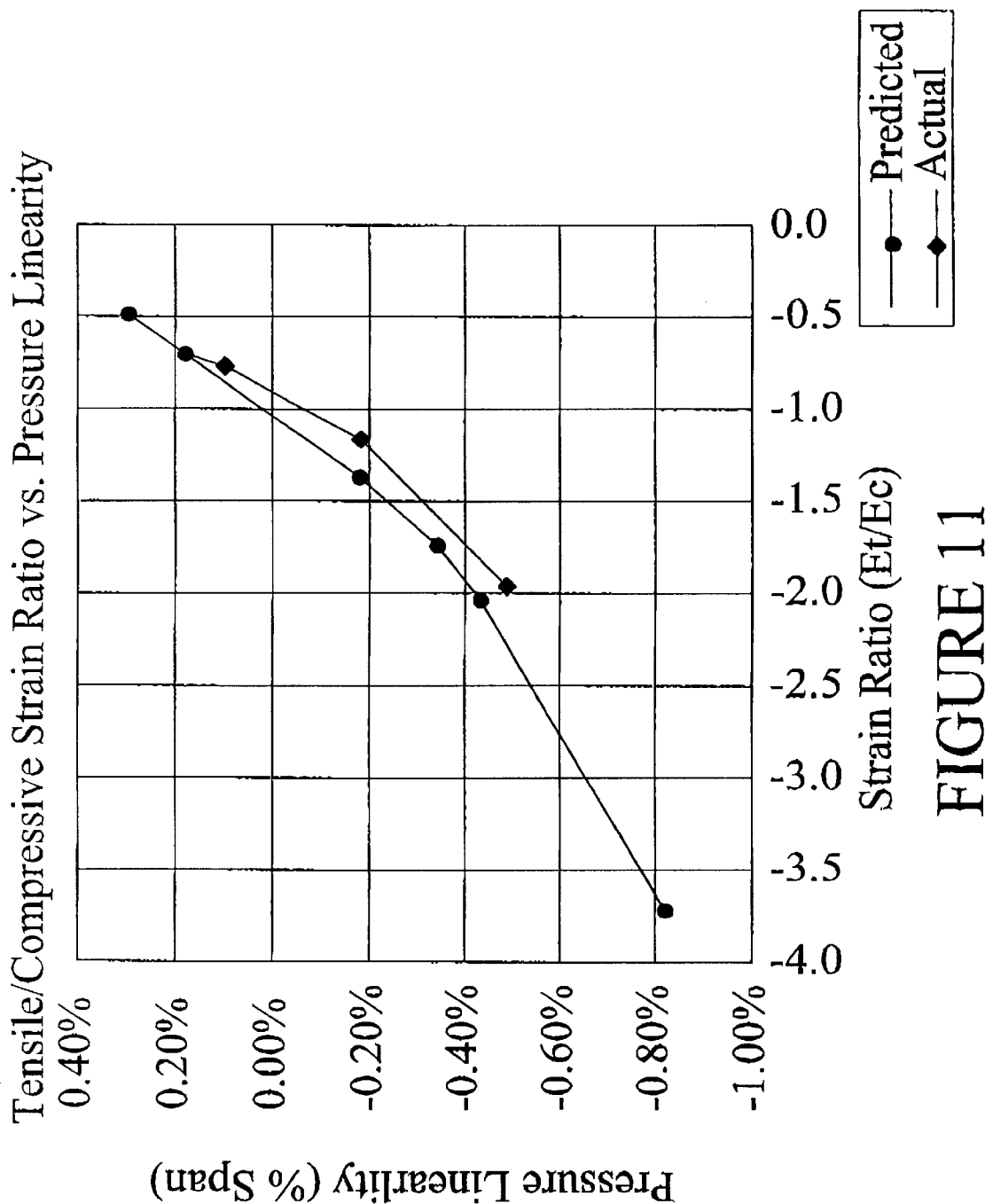
FIG. 11 is a graph depicting the relationship of linearity as a function of strain ratio.

When the ΔR's of the bridge are balanced the linearity of the output is perfect. But the linearity degrades as the ΔR's of the bridge become unbalanced. This is illustrated in FIG. 11.

In most cases, the position of the strain gauges R1–R4 can be adjusted to keep the ratio εt/εc close to one. In diaphragms with low t/D ratios this is done by moving the outer gauge slightly in from the outer edge of the active diameter. However, this becomes increasingly more difficult to do as the t/D ratio increases. As the t/D ratio increases the deflection begins to extend into the diaphragm frame 13, as explained above, and the maximum compressive strain εc spreads beyond the active diaphragm 19 diameter $D_1$ out into the diaphragm frame 13. In addition to this, the magnitude of maximum compressive strain εc decreases. Generally, the maximum compressive strain εc occurs at the "inflection" point, such as at line 51 in FIG. 3. Thus, the strain gauges, as shown in FIGS. 1 and 2, are moved outwards, even extending partly beyond the diameter $D_1$ of the active diaphragm 19 in order to try to maintain the εt/εc ratio close to one. Ultimately however, it becomes virtually impossible to maintain the εt/εc ratio close to one simply by repositioning the strain gauges R1–R4. This is a fundamental limitation in the design of high pressure or load sensing diaphragms, primarily due to three reasons. First, high t/D ratios are required in high pressure applications both because the active diaphragm 19 thickness must be increased to keep within material stress limits, and because the diameter of the diaphragm must be decreased to minimize forces. Second, the strain gauges have a minimum length that can be achieved during fabrication. Third, εt>>εc as t/D increases beyond 0.15.

According to the invention, however, the εt/εc ratio exhibited by an active diaphragm having a high t/D ratio can be maintained closer to one, thus avoiding degradation of the linearity of output of the strain gauges. This can be accomplished by providing an annular groove in the outer periphery of the diaphragm frame of a sensor having an active diaphragm with a high t/D ratio. One such example is a presently preferred embodiment of a strain gauge based sensor 30, shown in FIG. 4, having an active diaphragm 39 with a high $t_2/D_2$ ratio. Like the active diaphragm 19 of the prior art strain gauge based sensor 10, the active diaphragm 39 of the strain gauge based sensor 30 can also have a high $t_2/D_2$ ratio of, for example, 0.345. However, the annular groove 42 provided in the outer periphery 43 of the diaphragm frame 33 beneficially alters the strain field on the top surface of the active diaphragm 39, causing it to approximate a strain field typically resulting on a diaphragm having a t/D ratio of 0.15 or less.

When the groove 42 is located in the periphery of the diaphragm frame 33, it induces additional bending stresses and changes the deflection of the top surface of the active diaphragm 39 such that the deflection does not intrude as far beyond the diameter $D_2$ of the active diaphragm 39. As a result, the undesirable "spherical" deflection typically exhibited in conventional sensors 10 is avoided. The induced bending stress results in decreased shear stress and increased compressive stress, thus maintaining the εt/εc ratio close to one and causing the high $t_2/D_2$ ratio active diaphragm 39 to behave more like a diaphragm having a t/D ratio of about 0.15. Consequently, it is not necessary to reposition the strain gauges G1'–G4' farther apart to keep the εt/εc ratio close to one because the inflection point, where the maximum compressive strain εc occurs, is moved closer to the active diaphragm 39.

Figure 6:
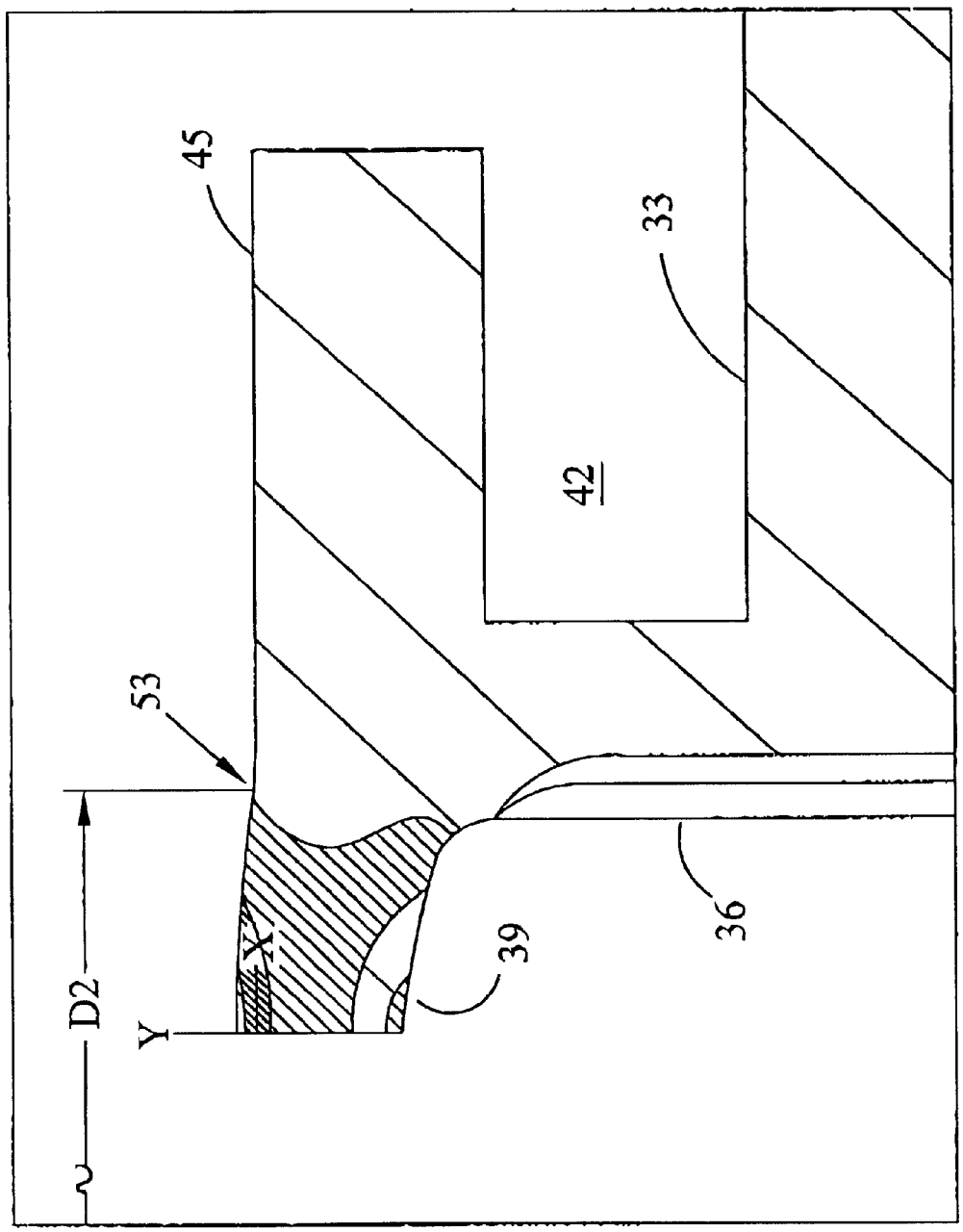
FIG. 6 shows the deflection of the active diaphragm of the sensor shown in FIG. 4.

As shown in the finite element analysis plot in FIG. 6, the annular groove 42 essentially "separates" a thin upper portion 45 from the diaphragm frame 33. The additional bending stresses induced by the frame groove 42 cause the upper portion 45 of the diaphragm frame 33 to flex when pressure is exerted on the underside of the diaphragm 39. As a result, the strain field is also altered—being more precisely associated with the active diameter $D_2$ of the active diaphragm 39. The increased bending stresses, in conjunction with the upward deflection of the upper portion 45 of the diaphragm frame 33, also results in increased compressive radial strain, thus creating increased magnitude ΔR from the outer strain gauges G1', G4'. As can be seen in the plot, which like FIG. 3 shows a cross section of only half of the sensor 30, the upward deflection of the upper portion 45 of the diaphragm frame 33 causes the inflection point 53 to be more closely associated to the diameter $D_2$ of the active diaphragm 39. In addition to better defining the boundary of the diameter $D_2$ of the active diaphragm 39 in terms of the strain field, the induced bending stresses also results a larger inflection, and thus the increased negative radial strain. Moreover, because of the increased $\Delta R$ resulting from the annular groove 42, the maximum stress in the active diaphragm can be reduced without reducing sensor output.

In designing the frame groove 42, the section of the diaphragm frame 33 enclosed within the circle enumerated 48 is preferably designed such that maximum stress in that section of the diaphragm frame is 50% to 90% of yield strength at the maximum operating pressure of load to which the sensor will be subjected. Presently preferred values (for the particular type of sensor used to illustrate this invention), and a typical range of such values, for the thickness ("h") of the upper portion 45 of the diaphragm frame 33, the width ("w") of the annular groove 42 and the wall thickness ("s") of the diaphragm frame 33 can be as follows:

h can be about 0.100 and can be from about 0.050 to about 0.200;

w can be about 0.075 and can range from about 0.050 to about 0.200; and s can be about 0.50 and can range from about 0.025 to about 0.075. Additionally, in a presently preferred embodiment $t_2$ can be about 0.054 and can range from about 0.040 to about 0.080. In general, it can be preferable to design the groove such that a maximum amount of deflection of the tupper portion 45 of the diaphragm frame 33 occurs without danger of structural failure of the sensor 30. This is the case because the more the deflection the more negative radial strain created, which increases the $\Delta R$ output of the outer strain gauges G1' and G4'.

Figure 13:
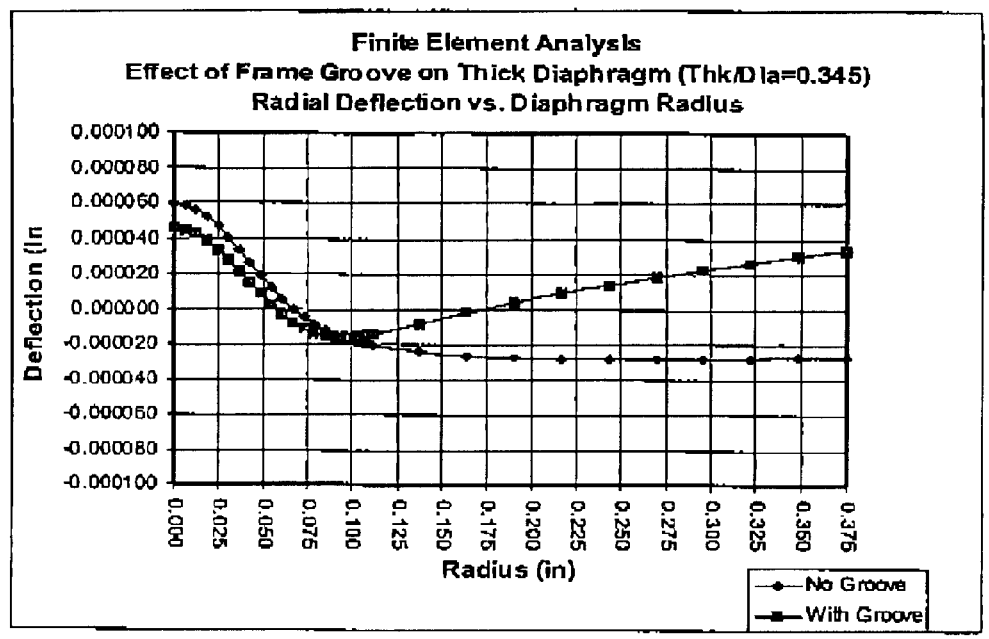
FIG. 13 is a graph representing a finite element analysis of the effect of strain gauge frame groove on radial deflection as a function of diaphragm radius for a given T/D ratio.

FIG. 13 illustrates the effect of a strain gauge sensor 30 having an annular groove 42 in the diaphragm frame 33 compared to a prior art strain gauge sensor 10 without such a groove in the diaphragm frame 13.

Figure 14:
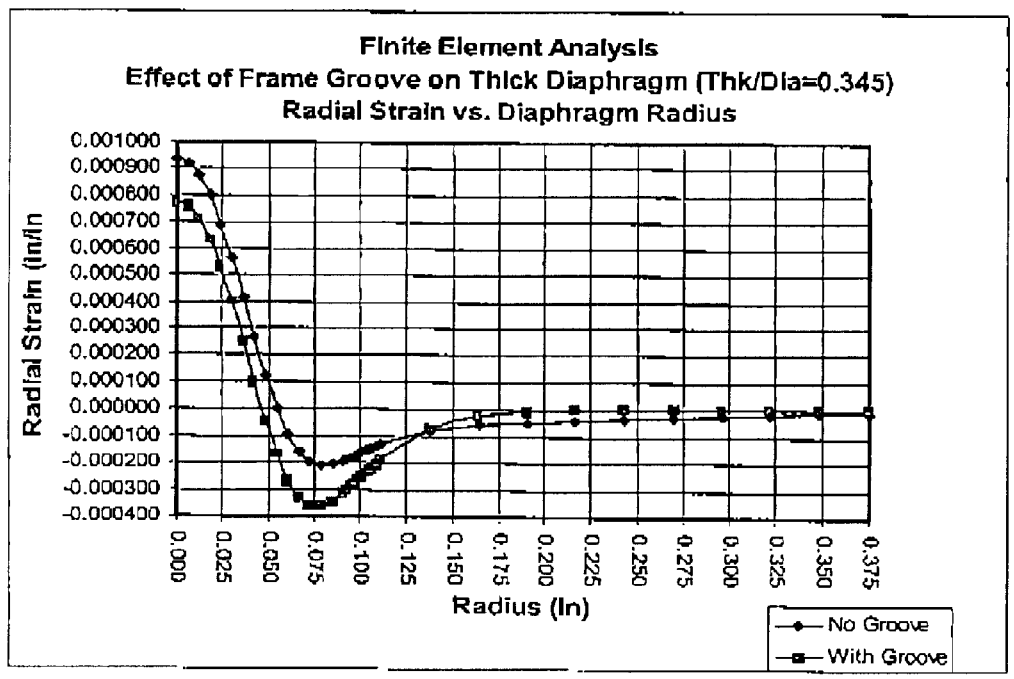
FIG. 14 is a graph representing a finite element analysis of the effect of strain gauge frame groove on radial strain as a function of diaphragm radius for a given T/D ratio.

As a result of the induced bending stresses and altered deflection in the active diaphragm 39, the magnitude of the maximum compressive strain increases and the $\epsilon t/\epsilon c$ ratio decrease;, moving closer to one as desired. This is illustrated in FIG. 14.

In sum, the provision of the groove 45 in the diaphragm frame 33 of the strain gauge sensor 30 improves the linearity of the output of the strain gauges G1'–G4' by bringing the $\epsilon t/\epsilon c$ ratio closer to one. Additionally, as mentioned previously, the maximum stress in the active diaphragm 39 can be reduced without reducing sensor output because the frame groove 42 results in the increased $\Delta R$ from the outer strain gauges G1' and G4'. The increased $\Delta R$ results from the increased bending stresses induced in the diaphragm 39 and altered deflection of the active diaphragm 39. The increased bending stresses also cause the aforementioned increased inflection at point 53 which results in the creation of the increased negative output values that provides the increased $\Delta R$ from the outer gauges.

EXPERIMENTAL TEST RESULTS

The benefits of this invention were demonstrated by modifying a conventional sensor, in particular, a 23,200 psi sensor commonly used to measure rail pressures on diesel engines. The conventional sensor was modified by providing an annular groove in the diaphragm frame of the sensor. The modified sensor exhibited an improvement in end-point based pressure non-linearity from the typical 0.5% (of full scale span) for a conventional sensor to 0.2%. In addition to the linearity improvement, a stress reduction of 15% (for equal sensor outputs) was also demonstrated. A full comparison of the modified sensor having a frame groove and a conventional sensor without a frame groove is set forth below in Table 1.

TABLE 1

| Design/Performance Parameter | Frame Groove Sensor | Conventional Sensor |
|---|---|---|
| Sensor Pressure Range | 23,200 psi | 23,200 psi |
| Diaphragm Active Diameter | 0.130" | 0.190" |
| Diaphragm Frame Diameter | 0.750" | 0.670" |
| Diaphragm Thickness | 0.054" | 0.073" |
| Diaphragm Corner Radius | 0.020" | 0.030" |
| Maximum Design Stress | 65969 psi | 70154 psi |
| Average Sensor Output | 194 mV | 175 mV |
| Average Pressure Linearity | 0.17% | 0.52% |
| $\Delta Rt/\Delta Rc$ Ratio | 1.18 | 2.02 |

As can be seen, there are some other differences between the sensor having a frame groove and the conventional sensor. However, these other differences are minor and have been determined to have no effect on the pressure linearity. The improvement in linearity exhibited is due to the addition of the peripheral groove in the diaphragm frame. The other differences, and the general reason therefore, is provided below.

The diaphragm frame diameter was increased from 0.670" to 0.750" to accommodate a new interface circuit used for test interface. Finite Element Analysis shows that diaphragm frame diameter ("d") has virtually no effect on sensor linearity.

The diameter of the active diaphragm was reduced from 0.190" to 0.130" so that a thinner diaphragm could be used. This enhances the effect of the peripheral frame groove and maximizes linearity improvement.

The active diaphragm corner radius was reduced from 0.030" to 0.020". This was done because the corner radius is directly related to the active diameter. The corner radius must increase along with the active diameter in order to keep the maximum design stress (which occurs at the corner) from exceeding material limits.

The actual test data in support of the results set forth above is provided below in Tables 2 and 3. The sensors with a frame groove are designated as A-1 through A-5, whereas conventional sensors are designated as DD-1 through DD-5.

TABLE 2

| Data: Sensor With Frame Groove | | | | | | | | | | | |
|---|---|---|---|---|---|---|---|---|---|---|---|
| S/N Pressure (psi) | A-1 Output (actual) | Output (Theo.) | Linearity (% span) | S/N Pressure (psi) | A-2 Output (actual) | Output (Theo.) | Linearity (% span) | S/N Pressure (psi) | A-3 Output (actual) | Output (Theo.) | Linearity (% span) |
| 0 | 4.3 | 4.3 | 0.00% | 0 | −78.3 | −78.3 | 0.00% | 0 | 8.3 | 8.3 | 0.00% |
| 11703.7 | 102.9 | 103.1 | −0.12% | 11703.7 | 21.2 | 21.6 | −0.22% | 11703.7 | 103.3 | 103.7 | −0.19% |

TABLE 2-continued

Data: Sensor With Frame Groove

| | | | | | | | | | | | |
|---|---|---|---|---|---|---|---|---|---|---|---|
| 23269.5 | 200.8 | 200.8 | 0.00% | 23269.5 | 120.4 | 120.4 | 0.00% | 23269.5 | 197.9 | 197.9 | 0.00% |
| | Span = 196.5 | | | | Span = 198.7 | | | | Span = 189.6 | | |
| | Incr. = 0.00844 | | | | Incr. = 0.00854 | | | | Incr. = 0.00815 | | |

| | Ohms @ P = 0 | Ohms @ P = FS | Delta R % R | | Ohms @ P = 0 | Ohms @ P = FS | Delta R % R | | Ohms @ P = 0 | Ohms @ P = FS | Delta R % R |
|---|---|---|---|---|---|---|---|---|---|---|---|
| R1 | 4049.9 | 3902.1 | −3.6% | R1 | 4113.6 | 3955.4 | −3.8% | R1 | 4048.4 | 3922.3 | −3.1% |
| R2 | 4056.4 | 4239.2 | 4.5% | R2 | 4127.4 | 4274.1 | 3.6% | R2 | 4124.8 | 4344.9 | 5.3% |
| R3 | 4202.9 | 4354.7 | 3.6% | R3 | 4799.2 | 5055.0 | 5.3% | R3 | 4179.4 | 4299.7 | 2.9% |
| R4 | 4195.2 | 4027.6 | −4.0% | R4 | 5126.5 | 4959.2 | −3.3% | R4 | 4230.5 | 4064.8 | −3.9% |
| b5 | 4124.8 | 4130.0 | | Rb | 4502.6 | 4517.3 | | Rb | 4144.9 | 4157.8 | |

| S/N Pressure (psi) | A-4 Output (actual) | Output (Theo.) | Linearity (% span) | S/N Pressure (psi) | A-5 Output (actual) | Output (Theo.) | Linearity (% span) |
|---|---|---|---|---|---|---|---|
| 0 | −17.1 | −17.1 | 0.00% | 0 | 44.1 | 44.1 | 0.00% |
| 11703.7 | 83.1 | 83.4 | −0.17% | 11703.7 | 137.0 | 137.3 | −0.16% |
| 23269.5 | 182.8 | 182.8 | 0.00% | 23269.5 | 229.4 | 229.4 | 0.00% |
| | Span = 199.9 | | | | Span = 185.3 | | |
| | Incr. = 0.00859 | | | | Incr. = 0.00796 | | |

| | Ohms @ P = 0 | Ohms @ P = FS | Delta R % R | | Ohms @ P = 0 | Ohms @ P = FS | Delta R % R |
|---|---|---|---|---|---|---|---|
| R1 | 4016.5 | 3862.4 | −3.8% | R1 | 4099.8 | 3964.3 | −3.3% |
| R2 | 4016.5 | 4162.1 | 3.6% | R2 | 4159.9 | 4348.0 | 4.5% |
| R3 | 4119.6 | 4340.8 | 5.4% | R3 | 4274.3 | 4428.0 | 3.6% |
| R4 | 4176.5 | 4040.5 | −3.3% | R4 | 4187.1 | 4041.6 | −3.5% |
| Rb | 4081.2 | 4099.5 | | Rb | 4179.7 | 4195.1 | |

TABLE 3

Data: Conventional Sensor Without Frame Groove

| S/N Pressure (psi) | DD-1 Output (actual) | Output (Theo.) | Linearity (% span) | S/N Pressure (psi) | DD-2 Output (actual) | Output (Theo.) | Linearity (% span) | S/N Pressure (psi) | DD-3 Output (actual) | Output (Theo.) | Linearity (% span) |
|---|---|---|---|---|---|---|---|---|---|---|---|
| 0 | −185.8 | −185.8 | 0.00% | 0 | −174.7 | −174.7 | 0.00% | 0 | −576.5 | −576.5 | 0.00% |
| 11645.26 | −91.6 | −90.5 | −0.56% | 11645.26 | −89.5 | −88.5 | −0.48% | 11645.26 | −486.7 | −485.6 | −0.60% |
| 23167.6 | 3.8 | 3.8 | 0.00% | 23167.6 | −3.3 | −3.3 | 0.00% | 23167.6 | −395.6 | −395.6 | 0.00% |
| | Span = 189.6 | | | | Span = 171.4 | | | | Span = 180.9 | | |
| | Incr. = 0.00818 | | | | Incr. = 0.00740 | | | | Incr. = 0.00781 | | |

| | Ohms @ P = 0 | Ohms @ P = FS | Delta R % R | | Ohms @ P = 0 | Ohms @ P = FS | Delta R % R | | Ohms @ P = 0 | Ohms @ P = FS | Delta R % R |
|---|---|---|---|---|---|---|---|---|---|---|---|
| R1 | 1136.5 | 1113.0 | −2.1% | R1 | 954.1 | 930.4 | −2.5% | R1 | 1224.1 | 1193.8 | −2.5% |
| R2 | 1047.1 | 1102.4 | 5.3% | R2 | 1012.7 | 1056.2 | 4.3% | R2 | 926.2 | 972.4 | 5.0% |
| R3 | 1163.5 | 1229.4 | 5.7% | R3 | 938.8 | 981.8 | 4.6% | R3 | 942.3 | 987.4 | 4.8% |
| R4 | 1246.0 | 1214.5 | −2.5% | R4 | 1146.6 | 1118.0 | −2.5% | R4 | 1132.8 | 1104.5 | −2.5% |
| Rb | 1145.5 | 1162.0 | | Rb | 1012.2 | 1020.8 | | Rb | 1056.0 | 1064.2 | |

| S/N Pressure (psi) | DD-4 Output (actual) | Output (Theo.) | Linearity (% span) | S/N Pressure (psi) | DD-5 Output (actual) | Output (Theo.) | Linearity (% span) |
|---|---|---|---|---|---|---|---|
| 0 | −276.8 | −276.8 | 0.00% | 0 | 422.3 | 422.3 | 0.00% |
| 11645.26 | −190.2 | −189.0 | −0.53% | 11645.26 | 502.1 | 502.9 | −0.42% |
| 23167.6 | −102.2 | −102.2 | 0.00% | 23167.6 | 582.6 | 582.6 | 0.00% |
| | Span = 174.6 | | | | Span = 160.3 | | |
| | Incr. = 0.00754 | | | | Incr. = 0.00692 | | |

| | Ohms @ P = 0 | Ohms @ P = FS | Delta R % R | | Ohms @ P = 0 | Ohms @ P = FS | Delta R % R |
|---|---|---|---|---|---|---|---|
| R1 | 948.6 | 926.8 | −2.3% | R1 | 1123.4 | 1096.5 | −2.4% |
| R2 | 1115.1 | 1164.6 | 4.4% | R2 | 1249.7 | 1307.2 | 4.6% |
| R3 | 999.1 | 1050.4 | 5.1% | R3 | 1261.2 | 1308.5 | 3.8% |
| R4 | 1471.9 | 1434.8 | −2.5% | R4 | 1000.2 | 977.3 | −2.3% |
| Rb | 1124.5 | 1135.7 | | Rb | 1158.0 | 1171.6 | |

The strain gauge sensor 30, like the prior art strain gauge sensor 10, can be made from steel or other metal and alloys. Additionally, it is also known to make strain gauge sensors from other materials, such as silicon. In any case, it should be understood that a sensor according to the invention, such as the sensor 30, can be made from any of the different types of material from which conventional sensors are made.

Figure 4:
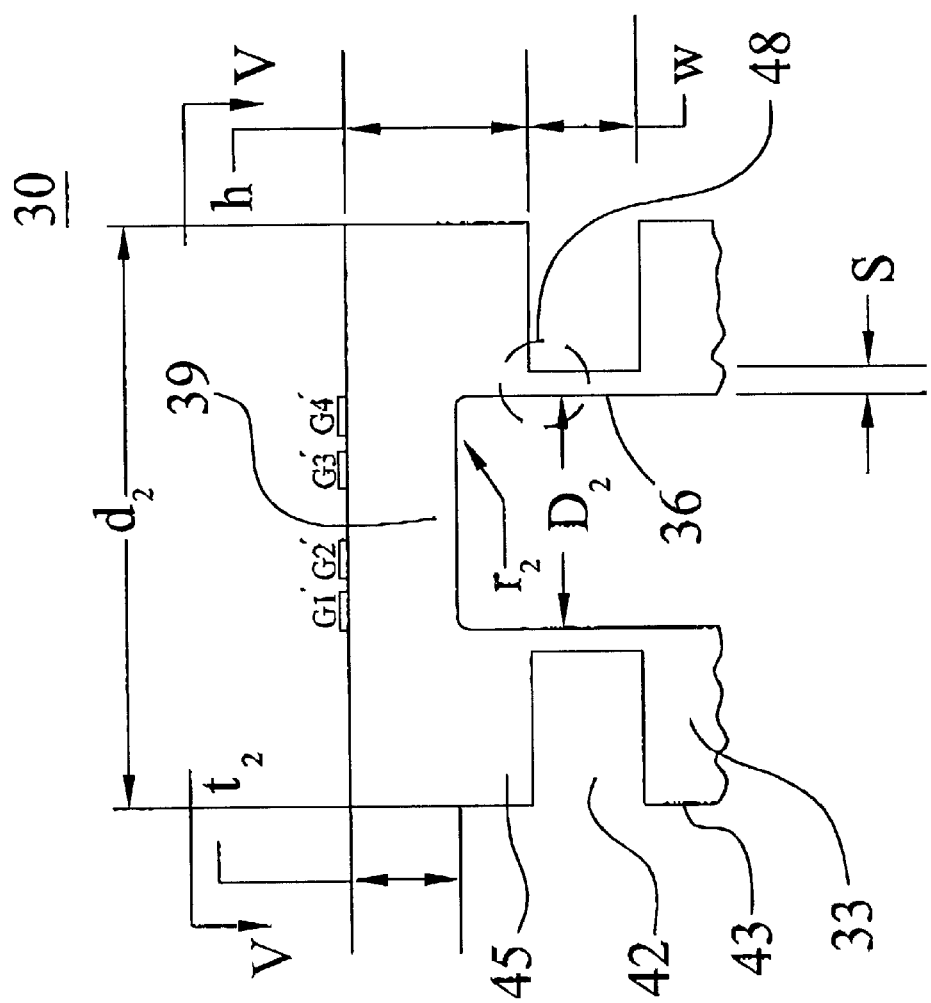
FIG. 4 is a front cross sectional view of an upper portion of a presently preferred embodiment of a strain gauge based pressure sensor with a high t/D ratio active diaphragm and a groove provided in the frame.
Figure 5:
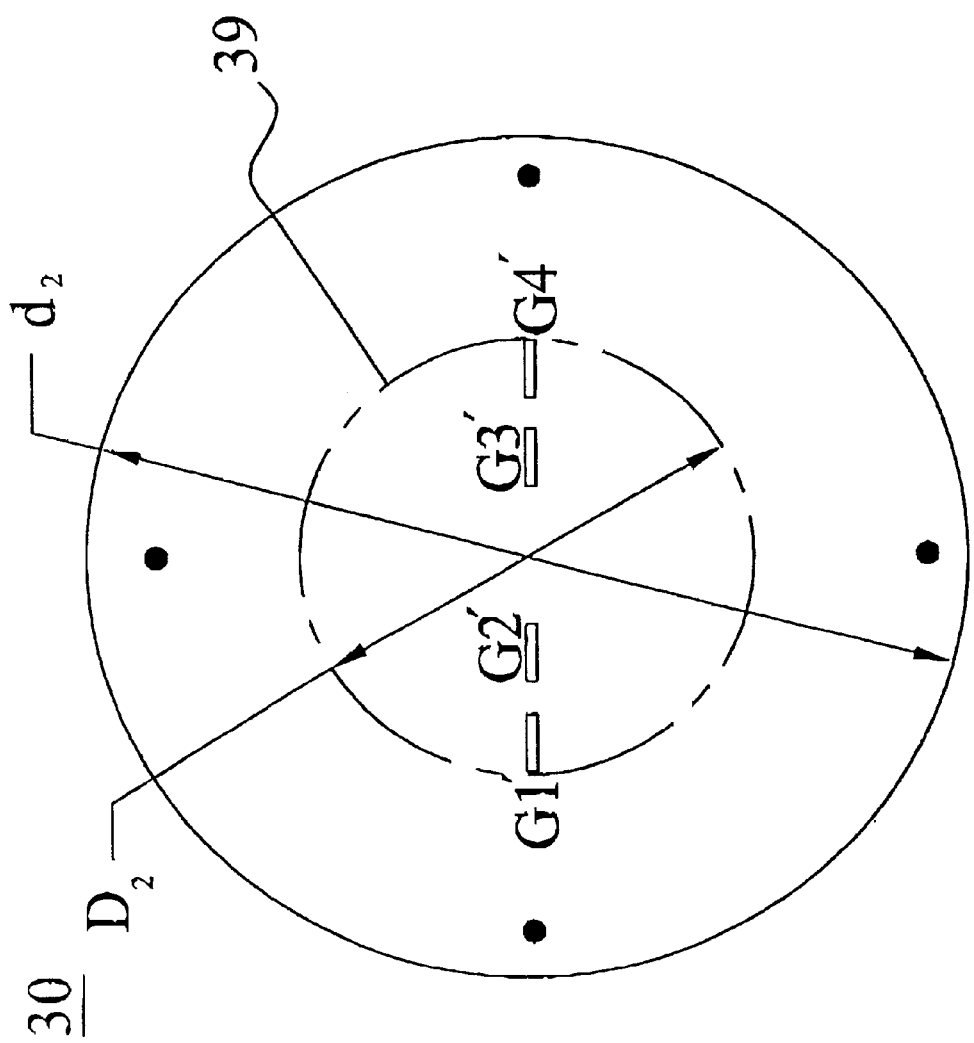
FIG. 5 is a top plan view taken along line V—V in FIG. 4.
Figure 7:
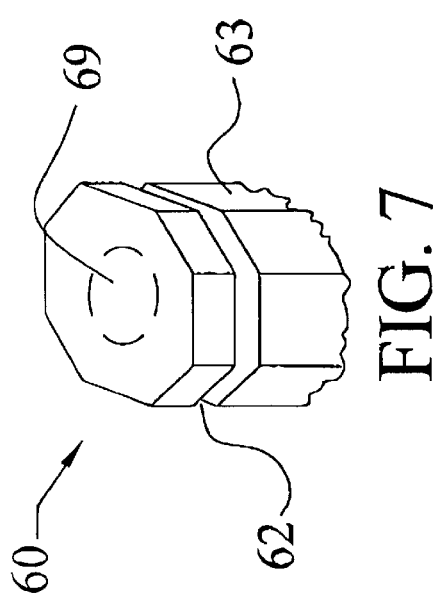
FIG. 7 is a perspective view of an upper portion of a second embodiment of the invention wherein the diaphragm frame is non-cylindrical.

Although the diaphragm frame 33 is shown in FIGS. 4–6 as having a cylindrical shape, the diaphragm frame may take on other shapes. For example, as shown in FIG. 7, a sensor 60 can have a non-cylindrical diaphragm frame 63, such as the hexagonal shape shown. Despite the non-cylindrical diaphragm frame 63, the active diaphragm 69, shown in dashed lines for reference, can still be cylindrical. However, the annular groove 62 preferably would have the same shape as the active diaphragm 69.

Figure 8:
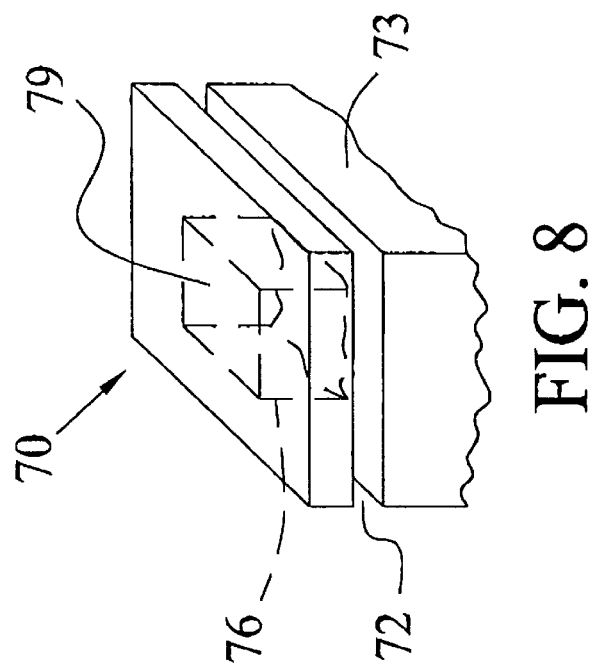
FIG. 8 is a view similar to that in FIG. 7, except showing a third embodiment of the invention wherein both the diaphragm frame and the active diaphragm are non-cylindrical.

Similarly to the diaphragm frame 33, the active diaphragm 39 is also shown in FIGS. 4–6 as having a cylindrical shape. However, the active diaphragm 39 can also have a non-cylindrical shape. As shown in FIG. 8, a sensor 70 can have both a non-cylindrical diaphragm frame 73 and a non-cylindrical active diaphragm 79, shown in dashed lines. In this example, both the diaphragm frame 73 and the active diaphragm 79 are square. Consequently, the annular groove 72 preferably also would have a square inner perimeter matching the square active diaphragm. As shown in phantom lines, the sensor 70 will likewise have a square bore 76 with dimensions that generally define the dimensions of the active diaphragm 79. Such generally square shaped high pressure sensors, except not having an annular groove, are known in the prior art to be made from silicon.

In the previous description, wherein the active diaphragm was circular, the ratio of thickness to diameter, t/D, is utilized. Obviously, this ratio will not apply to a non-circular active diaphragm. However, because the surface area ("A") of a circular shaped active diaphragm is directly related to the diameter, i.e. $A=\pi D^2/4$, the ratio can also be expressed in terms of thickness to surface area. Solving the area equation for D and substituting that into the equation t/D=0.15, the equivalent equation in terms of area becomes $t^2/A=0.029$, approximately. The $t^2/A$ ratio thus can be used to define a "thick" active diaphragm regardless of the actual shape of the active diaphragm. Accordingly, for non-circular/cylindrical shaped active diaphragms, such as a square, rectangular, hexagonal, or other shaped diaphragm, a ratio or $t^2/A$ equal to or less than about 0.029 would define a "thick" diaphragm in regard to the application of simple diaphragm theory wherein shear stress is insignificant.

Figure 9:
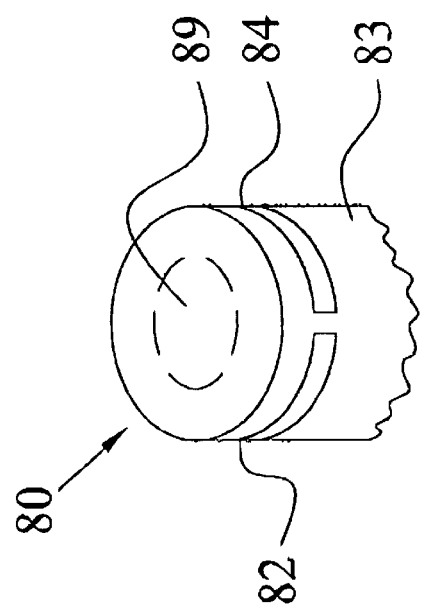
FIG. 9 is a view similar to that in FIG. 8, except showing a fourth embodiment of the invention wherein an annular groove is not provided around the entire periphery of the diaphragm frame.

In all of the drawing figures, and in all of the associated description, the annular groove 42, 62, 72, is shown and described as being provided around the full periphery of the diaphragm frame 33, 63, 73 outer surface. However, this need not necessarily be the case. Although providing the annular groove 42, 62, 72 entirely around the diaphragm frame 33, 63, 73 may be the simplest to provide, and may also provide the optimal improvement in linearity, the annular groove could instead be provided around less than the entire periphery of a diaphragm frame. As shown in FIG. 9, perhaps preferable to an annular groove provided less than entirely around the periphery, a sensor 80 could instead be provided multiple annular grooves 82, 84, for example, at spaced apart locations around the periphery of the diaphragm frame 83. The two annular groove portions 82, 84 could be provided at opposing locations around the periphery of the diaphragm frame 83. The length of each groove portion 82, 84 around the periphery could preferably be equal for purposes of symmetry about the active diaphragm 89. Alternatively, three annular groove portions could be provided instead of two, positioned at equally spaced locations around the periphery and having equal lengths, for the same reasons of maintaining symmetry. Additionally, the annular groove portions could conceivably be in different planes.

Moreover, although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A strain gauge based pressure sensor, comprising:

a diaphragm frame in the general shape of a tube, said tube defining an outer surface generally centered on an axis and having a transverse cross-sectional first geometric shape defining a transverse outer dimension, and also defining a central bore, also generally centered on said axis, said central bore defining a cross-sectional second geometric shape, which may be the same as said first geometric shape, said bore defining a maximum transverse dimension smaller than said transverse outer dimension of said first geometric shape;

an active diaphragm monolithic with said diaphragm frame, said active diaphragm generally defining a diaphragm plane transverse to said axis, said active diaphragm closing off a distal end of said diaphragm frame, whereby the closed-off distal end of said diaphragm frame can withstand fluid pressure, but said active diaphragm deflects in an outward direction, away from said bore, in response to pressure within said bore, said active diaphragm having a generally uniform thickness dimension measured in a direction parallel with said axis between inner and outer surfaces of said diaphragm, the ratio of the square of said generally uniform thickness dimension of said diaphragm divided by said transverse dimension of said bore having a value greater than about 0.029;

a plurality of strain gauges mounted on an outer surface of said active diaphragm for generating a pressure-related signal in response to said deflection of said active diaphragm;

said diaphragm frame further defining at least one annular groove extending from said outer surface of said diaphragm frame radially inward toward said axis, to a depth insufficient to open said annular groove into said bore, said annular groove defining two planar, mutually parallel, annular walls, the planes of which annular walls are distal from said diaphragm plane and generally parallel therewith, said at least one groove thereby acting to effectively "separate" a distal-most portion of said diaphragm frame from that portion of said diaphragm frame more proximal than said annular groove, which in turn tends to reduce "spherical" deflection of said active diaphragm.

2. The sensor of claim 1, wherein:

said first geometric shape of said diaphragm frame, the geometric shape of said active diaphragm portion, and said second geometric shape of said bore each have a circular cross sectional shape; and said groove is an annular groove provided in a plane transverse to said axis of said bore.

3. The sensor of claim 1 further comprising:
said diaphragm frame having a wall thickness about said bore established by the difference between said transverse dimension of said outer surface of said diaphragm frame and said transverse dimension of said bore;
said annular groove having a width defined by said two planar, mutually parallel walls, and a depth such that an annular section of said diaphragm frame is defined between said annular groove and said bore, said annular section having a width equal to said width of said annular groove, said annular section having a thickness generally equal to said wall thickness of said diaphragm frame less said depth of said annular groove; and wherein
said annular section width and thickness are selected to maximize deflection of a portion of said diaphragm frame above said annular groove while avoiding structural failure of said annular section.

4. The sensor of claim 3 wherein the dimensions of said annular section are selected whereby maximum stress in said annular section is from about 50 percent to about 90 percent of yield strength of said annular section.

5. The sensor of claim 3 wherein:
the width of said annular section as measured by the spacing between said mutually parallel walls ranges from about 0.050 inches to about 0.200 inches;
said annular groove is located with respect to said outer surface of said diaphragm such that a portion of said diaphragm frame more distal than said annular groove has a thickness of from about 0.050 inches to about 0.0200 inches; and
said annular section depth ranges from about 0.025 inches to about 0.075 inches.

6. The sensor of claim 1 wherein said annular groove is segmented to define a plurality of annular groove segments lying in a common plane, and located at spaced apart locations around the periphery of said diaphragm frame.

7. The sensor of claim 6 wherein said plurality of annular groove segments have equal length, and each groove segment is equidistantly spaced apart from the other groove segments around said periphery.

8. The sensor of claim 1 wherein:
said outer surface of said diaphragm frame, said active diaphragm portion, and said bore each define a multi-sided cross sectional shape in cross-section transverse to said axis; and
said groove provided in a plane transverse to said axis has a cross-sectional shape corresponding to said multi-sided cross sectional shape.

9. A sensor according to claim 1, wherein said first geometric shape is a circle defining a diameter as said transverse outer dimension of said first geometric shape.

10. A sensor according to claim 1, wherein said second geometric shape is a circle defining a diameter as said maximum transverse dimension of said bore.

11. A sensor according to claim 1, wherein said first geometric shape is a polygon.

12. A sensor according to claim 11 wherein said polygon is an octagon.

13. A sensor according to claim 1, wherein said second geometric shape is polygonal.

14. A sensor according to claim 13, wherein said second geometric shape is square.

15. A sensor according to claim 1, wherein said plurality of strain gauges are mounted in a straight line, which straight line is parallel with a diameter of said central bore.

16. In a strain gauge based pressure sensor having a diaphragm frame defining an outer surface and an axial bore, both centered on an axis, and an active diaphragm monolithic with a distal end of said diaphragm frame, said active diaphragm portion having thickness defined in the direction of said axis and defining a distal surface area generally orthogonal to said axis, wherein a ratio of the square of the thickness to the surface area is greater than 0.029, said sensor having a plurality of strain gauges affixed to a distal surface of at least one of said active diaphragm and said diaphragm frame for transforming a deflection of said active diaphragm into electrical output representative of a magnitude of a pressure inducing said deflection, the improvement comprising a generally planar groove extending from at least a portion of said outer surface of said diaphragm frame toward said bore, the plane of said groove being generally transverse to said axis.

17. The sensor of claim 16 wherein:
said outer surface of said diaphragm frame, said active diaphragm portion, and said bore each has a circular cross sectional shape centered on said axis; and
said groove is an annular groove lying in a plane transverse to said axis.

18. The sensor of claim 17 wherein said annular groove extends entirely around the periphery of said outer surface.

19. The sensor of claim 18 wherein:
said diaphragm frame defines a wall thickness about said bore;
said annular groove defines a width and a depth such that an annular section of said diaphragm frame lies between said annular groove and said bore, said annular section of said diaphragm frame having a width equal to said width of said annular groove, said annular section of said diaphragm frame having a thickness generally equal to said wall thickness of said diaphragm frame less said depth of said annular groove; and
said annular section of said diaphragm frame having width and thickness dimensions selected to maximize deflection of a portion of said diaphragm frame distally located relative to said annular groove while avoiding structural failure of said annular section.

20. The sensor of claim 19 wherein the dimensions of said annular section are selected such that maximum stress in said annular section is from about 50 percent to about 90 percent of yield strength of said annular section.

21. The sensor of claim 19 wherein:
the width of said annular section ranges from about 0.050 inches to about 0.200 inches;
said annular groove is located with respect to a distal surface of said diaphragm frame such that portion of said diaphragm frame more distal than said annular groove has a thickness of from about 0.050 inches to about 0.0200 inches; and
the depth of said annular section depth is from about 0.025 inches to about 0.075 inches.

22. The sensor of claim 19 wherein:
said outer surface of said diaphragm frame, said active diaphragm portion, and said bore each has a multi-sided cross sectional shape centered on said axis; and
said groove provided in a plane transverse to said axis bore has a shape corresponding to said multi-sided cross sectional shape.

23. The sensor of claim 17 wherein said annular groove is segmented into a plurality of segmented annular grooves at spaced-apart locations around said periphery.

24. The sensor of claim 23 wherein each of said plurality of annular groove segments has equal length, and each is equidistantly spaced apart around said periphery.

25. A strain gauge based sensor comprising:
(a) a monolithic diaphragm frame and diaphragm structure, said diaphragm frame defining an outer surface and a bore therein centered on an axis, with a dimension of said active diaphragm portion generally defined by a transverse dimension of said bore, whereby said active diaphragm has a diameter generally equal to a diameter of said bore, said bore having a distal end communicating with a proximal side of said active diaphragm and a proximal end for communicating with a source of pressure to be applied to said proximal side of said active diaphragm;
(b) said active diaphragm having a thickness as measured parallel with said axis between said proximal side and a distal side, the thickness-to-diameter ratio of said active diaphragm being selected to be greater than 0.15;
(c) a generally planar annular groove extending radially inward from said outer periphery of said diaphragm frame with the plane of said annular groove transverse to said axis of said bore; and
(d) a plurality of strain gauges affixed to a distal surface of at least one of said active diaphragm portion and said diaphragm frame for transforming a deflection of said diaphragm into electrical output representative of a magnitude of a pressure inducing said deflection.

26. The sensor of claim 25 wherein said annular groove extends entirely around said periphery.

27. The sensor of claim 26 wherein:
said diaphragm frame defines a wall thickness about said bore;
said annular groove has a width and a depth such that an annular section of said diaphragm frame is defined between said annular groove and said bore, said annular section having a width equal to said width of said annular groove, said annular section having a thickness generally equal to said wall thickness of said diaphragm frame less said depth of said annular groove; and
said annular section width and thickness are selected to maximize deflection of a portion of said diaphragm frame above said annular groove while avoiding structural failure of said annular section.

28. The sensor of claim 27, wherein said annular width and thickness of said annular section are selected such that maximum stress in said annular section is from about 50 percent to about 90 percent of yield strength of said annular section.

29. The sensor of claim 27 wherein:
said annular section width lies in the range extending from about 0.050 to about 0.200 inches;
said annular groove is located with respect to a distal surface of said diaphragm frame such that a portion of said diaphragm frame above said annular groove has a thickness of from about 0.050 to about 0.0200 inches; and
the depth of said annular section is from about 0.025 to about 0.075 inches.

30. The sensor of claim 25 wherein said annular groove is segmented, and comprises a plurality of annular groove segments located at spaced-apart locations around said periphery.

31. The sensor of claim 30, wherein said plurality of annular grooves have equal lengths, and each is equidistantly spaced apart from the others around said periphery.

32. In a strain gauge based sensor having a diaphragm frame and a bore therein centered on an axis, which bore generally defines an active diaphragm portion of said diaphragm frame, in that said active diaphragm portion has a diameter generally equal to a diameter of said bore, said active diaphragm portion having a thickness wherein the thickness to diameter ratio is greater than 0.15, said sensor having a plurality of strain gauges affixed to a top surface of at least one of said active diaphragm and said diaphragm frame for transforming a deflection of said active diaphragm into electrical output representative of a magnitude of a pressure inducing said deflection, the improvement comprising a planar annular groove in at least a portion of an outer periphery of said diaphragm frame, and with said plane of said annular groove transverse to said axis.

33. The sensor of claim wherein said annular groove extends entirely around said periphery.

34. The sensor of claim 33 further comprising:
said diaphragm frame having a wall thickness about said bore;
said annular groove having a width and a depth such that an annular section of said diaphragm frame is defined between said annular groove and said bore, said annular section having a width equal to said width of said annular groove, said annular section having a thickness generally equal to said wall thickness of said diaphragm frame less said depth of said annular groove; and
said annular section width and thickness are designed to maximize deflection of a portion of said diaphragm frame above said annular groove while avoiding structural failure of said annular section.

35. The sensor of claim 34 further comprising said annular section designed such that maximum stress in said annular section is from about 50 percent to about 90 percent of yield strength of said annular section.

36. The sensor of claim 34 further comprising:
said annular section width being from about 0.050 to about 0.200 inches;
said annular groove located with respect to a top surface of said diaphragm frame such that a portion of said diaphragm frame above said annular groove has a thickness of from about 0.050 to about 0.0200 inches; and
said annular section depth being from about 0.025 to about 0.075 inches.

37. The sensor of claim 32 wherein said annular groove further comprises a plurality of annular grooves provided at spaced apart locations around said periphery.

38. The sensor of claim 37 further comprising said plurality of annular grooves each having an equal length and each being equidistantly spaced apart around said periphery.

* * * * *